United States Patent [19]

Gelhard et al.

[11] 3,861,319

[45] Jan. 21, 1975

[54] TRANSPORTATION SYSTEM FOR HOSTILE ENVIRONMENTS

[76] Inventors: Egon Gelhard, Mehlemer Strasse 28, 5 Cologne 51; H. Rudolf Gunkel, Egerlander Strasse 5a, 6390 Usingen, both of Germany

[22] Filed: Aug. 14, 1972

[21] Appl. No.: 279,769

Related U.S. Application Data

[63] Continuation-in-part of Ser. No. 227,856, Feb. 22, 1972, Pat. No. 3,776,141.

[30] Foreign Application Priority Data

Aug. 12, 1971 Germany............................ 2140244

[52] U.S. Cl................... 104/124, 104/138, 104/123
[51] Int. Cl.............................................. B61b 13/10
[58] Field of Search ............ 243/1, 37; 104/89, 106, 104/118–121, 123, 124, 125, 138, 139, 140, 88

[56] References Cited
UNITED STATES PATENTS

| | | | |
|---|---|---|---|
| 718,237 | 1/1903 | Zimmerman........................ | 104/123 |
| 1,061,035 | 5/1913 | Batcheller....................... | 104/138 R |
| 2,928,357 | 3/1960 | McBride.......................... | 104/138 G |
| 3,403,634 | 10/1968 | Crowder.......................... | 104/138 R |
| 3,490,717 | 1/1970 | Retler.................................. | 243/1 |
| 3,508,497 | 4/1970 | Matsukata........................ | 104/138 R |
| 3,520,514 | 7/1970 | Evans................................... | 104/126 |
| 3,650,216 | 3/1972 | Broome.............................. | 104/167 X |

*Primary Examiner*—M. Henson Wood, Jr.
*Assistant Examiner*—D. W. Kern
*Attorney, Agent, or Firm*—Finnegan, Henderson, Farabow and Garrett

[57] ABSTRACT

A transportation system is disclosed and claimed herein for the conveyance of petroleum or other products from areas having adverse climatic conditions to a destination where the materials may be more conventionally handled. The system likewise includes means for returning transportation vehicles to the point of origin for refilling. A pipe conduit system is suspended from a plurality of supports and receives at least one vehicle movable on a trackway therethrough. The vehicle is self driven and receives power from a power supply located within the conduit. Additionally, outside rails may be secured to the pipe conduit, so as to receive additional outside driven vehicles for the transportation of freight or passengers.

The vehicle of the present invention comprises a transportation container suspended on opposite ends thereof from two independent drive units. The drive units have a housing with male and female coupling members secured thereto and extending outwardly in opposite directions therefrom. Received around the housing is a rotatable drum that serves as a single wheel for the driving unit and engages the trackway within the conduit. The drum is provided with preferably an alternating current electric motor coupled to a hydrodynamic torque converter which in turn is coupled to a sun and planet gear arrangement. The interior periphery of the drum is associated with one of the gears of the sun and planet gear arrangement so as to receive driving power therefrom. Electric power is received by contacts on the housing that engage current rails received in the upper portion of the conduit. Both the transportation system and the vehicle are claimed.

59 Claims, 9 Drawing Figures

TRANSPORTATION SYSTEM FOR HOSTILE ENVIRONMENTS

This application is a continuation-in-part of our co-pending U.S. Pat. application, Ser. No. 227,856, filed Feb. 22, 1972, now U.S. Pat. No. 3,776,141.

BACKGROUND OF THE INVENTION

The invention concerns a scheme for transporting liquid, lump or dustlike goods, particularly petroleum and other earth valuables in regions with arctic climatic and geologic conditions. At least one pipe conduit is placed above the ground, inside which are received self-driven transportation containers.

The invention fundamentally deals with the task to improve and further develop the transportation scheme described in our above-mentioned, copending patent application. In like manner a pipe railroad is provided with freight cars moving inside a pipe conduit system. Particularly, the problem of transporting about 75 million tons of petroleum annually from the oil drilling fields on Burdhoe Bay in North Alaska to the port of Valdez or to another location has been solved. At the destination, the products are transferred to conventional rolling or other stock.

Simultaneously, the system of the present invention facilitates the shipment of materials require for construction and operation of the instant transportation system as well as those normally required at the drilling fields. Further, the instant system provides a passenger transportation system for the employees and general populace which furthers the general economic and cultural development of the surrounding area. The present transportation system offers economical operation, little maintenance expense and a particularly long life. Moreover, it meets, without exception, all conditions established for protection of the environment, and is further suited for transportation en masse of minerals and other natural products besides petroeum.

To solve these problems, the teachings of the present invention call for a pipe conduit of the pipe railroad to be suspended by ropes from spaced supports along its itinerary. Due to suspension from above, minor dislocations and shifts of the arctic soil, as well as thermally induced changes in length, do not immediately affect the pipe conduit. To achieve an even loading, the suspension is polygonal.

SUMMARY OF THE INVENTION

It is an object of the present invention to provide an improved system for the transportation of petroleum and other products from arctic regions in an economical manner and without damage to the environment.

Another object of the present invention is to provide an improved transportation system where a vehicle passes through a conduit and where addtional rolling stock is movable along rails secured outside of said conduits.

Still another object of the present invention is to provide a unique vehicle for passage through a pipe conduit transportation system.

Yet further, another object of the present invention is to provide an extremely low maintenance enclosed transportation system along an extended itinerary.

Generally speaking, the present invention is directed to a transportation system comprising two conduits, said conduits being disposed adjacent each other and having connectors therebetween, said conduits having a vehicle trackway received therein and extending therealong, said conduits further having vehicle power supply means disposed therein and extending at least a major portion of the length thereof; a loop trackway at opposite ends of said conduits, said loops uniting said conduits at said ends, one of said loops having vehicle filling means associated therewith and the other of said loops having vehicle emptying means associated therewith; a plurality of supports for said conduits and said loops, said supports comprising a plurality of struts, a foundation for each strut, said strut being secured thereto at one end thereof, and a cross brace adjacent opposite, upper ends of said supports, said cross brace being secured to said struts to form a unitary structure; and a vehicle receivable within said conduits and movable along said trackway.

According to a special characteristic of the invention, two pipe conduits lying one above the other are suspended in a common vertical plane and are rigidly interconnected to increase the sectional modulus of the conduits in the direction of gravity or loading. One of the conduits is used for the forward transportation and the other conduit of the back or return transportation. Hence filled containers are transported through a conduit away from the point of origin and empty containers or containers carrying other freight are returned to the point of origin through the other conduit.

According to a further characteristic of the invention, the suspension supports of the pipe conduit system are developed into four legged supports, prefabricated and resting upon foundations. Two of the legs extend out on either side of the pipe of the pipe conduits, the upper ends of the legs being interconnected by a cross-like cross beam with four arms which lies diagonally through the vertical plane of the suspended pipe conduits. The suspension ropes are secured at one end to the crossing point and at an opposite end to a conduit.

According to a further characteristic of the invention, the track inside each pipe consists not of two parallel rails, but of a single one. The track thus provides a driving surface extending from the left inner wall of the pipe to the right inner wall and has a V-shaped rail located at the mid point thereof. The drive units movable over this driving surface consist each of a driven drum the surface of which is covered with an abrasion resistant material. Wear of the pipe railroad occurs only on the rolling stock and no longer at the rails. A long wear life is thereby achieved for the transportation system according to the present invention.

The vehicle movable through the conduits according to the teachings of the present invention comprise elongated containers, preferably having a cross section that substantially fills the space within the conduit. The container is suspended at opposite ends thereof by separate drive units to which it is removably coupled. The drive units as mentioned above, comprise a driven drum. The drum has an electric motor received therein for affording power thereto. The electric motor is coupled to a hydrodynamic torque converter which in turn is coupled to a sun and planet gear which in turn is coupled to the inner periphery of the drum. Current taps are provided on the drive unit for receiving power supply from within the conduit for the electric motor. Likewise, magnetic brakes are provided for the drive units.

The coupling arrangement for the vehicle of the present invention is represented by a male flange secured to and extending outwardly from one end of said container and said drive unit. A female coupling flange is secured to and extends outwardly from the opposite ends of the container and the drive unit, whereby the female member may receive a male member therein so as to couple one end of a vehicle unit to an opposite end of an adjacent vehicle unit. In this fashion, the containers in which the freight is placed are suspended between drive units and do not touch the rails.

Additionally, control units and monitoring equipment may be provided in the conduits, on the vehicles and outside of the conduits on the supports and the outside rolling stock receivable on the outside of the conduits. In this regard, it is also an embodiment of the present invention to provide a flexible gasket surrounding the container body and extending outwardly to substantially enclose the remainder of the cross-section of the conduit whereby movement of a vehicle forces air in the conduit ahead of the vehicle. In this manner, pressure measurements may be made of air in the conduit so as to control movement of vehicles therethrough.

DESCRIPTION OF THE PREFERRED EMBODIMENTS

Figure 1:
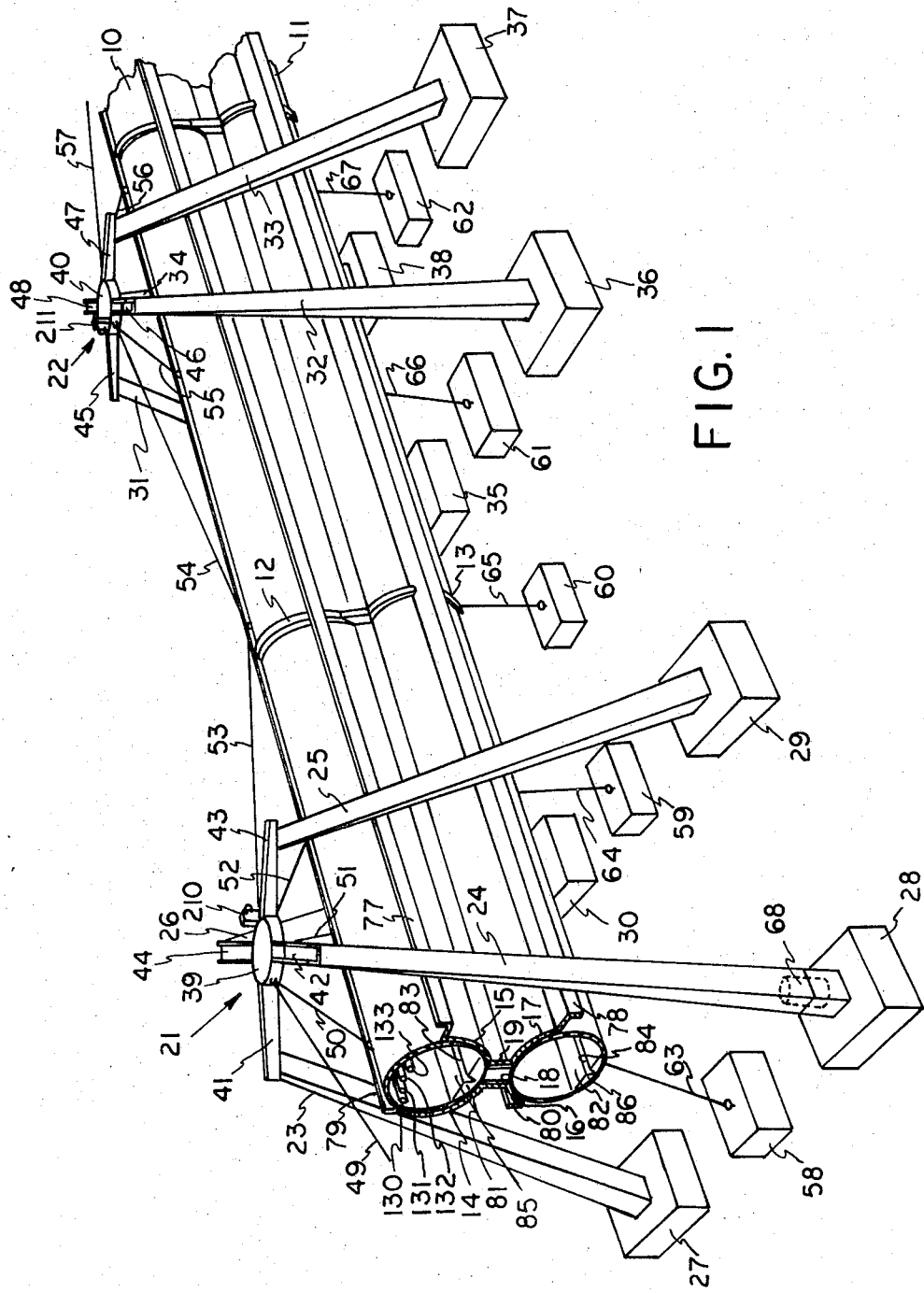
FIG. 1 is a partial section in perspective of the transportation system according to the present invention showing two suspended pipe conduits, one located above the other.

According to FIG. 1, the transportation scheme according to the invention consists of two pipe conduits 10 and 11 located one above the other. One of the conduits serves for the forward transportation and the other conduit for the return transportation. The two pipe conduits 10 and 11 are preferably steel pipes having a 1,219.2 mm outside diameter and are interconnected at flanges 12 and 13 by screws. To increase the sectional modulus of the system in the direction of gravity or of loading, the pipe conduits 10 and 11 are rigidly interconnected. The rigid connection between the two pipe conduits 10 and 11 is achieved by means of four halves of walkway members which form opposite mirror pairs and are connected to the proper pipe conduit outer walls. Walkway members are preferably welded to the conduits. The four walkway halves 14 through 17 overlap in a range between the pipe conduits 10 and 11 on both sides of the vertical plane of symmetry, each forming vertical walls 18 and 19 respectively. Walkway halves 14 and 16 form the side wall 18 and walkway halves 15 and 17 form the side wall 19. The overlapping walkway halves 14 and 16 or 15 and 17 forming side walls 18 and 19 respectively are fastened to each other within the range of overlap by cross bolts 20 or the like (See FIG. 2). The rigid connection between the two support pipes 10 and 11 ensures a light weight, bend resistant, load-bearing support construction. Suspension and bracing of the conduits from and by a polygon suspension rope system and a polygon bracing system enable wind and snow loadings to be sustained without appreciable sagging of the pipe conduit system. The pipe conduits 10 and 11 are suspended by ropes from supports 21 and 22 spaced along their itinerary. Supports 21 and 22 are preferably 24 meters apart and are preferably developed into four-legged prefabricated supports resting on foundations. Thus, support 21 is provided with four legs 23, 24, 25 and 26, which rest on foundations 27, 28, 29 and 30 respectively. Likewise, support 22 has four legs 31, 32, 33 and 34, resting on foundations 35, 36, 37 and 38, respectively. The four-leg supports 21 and 22 reach beyond either side of the pipe conduits 10 and 11 with two legs. The tops of legs 23 through 26 or 31 through 34 are interconnected by a cross-like cross beam 39 or 40 respectively, lying perpendicular to the vertical plane of the suspended pipe conduits 10 and 11. The cross beams 39 and 40, like the support legs, are of steel. The cross beam 39 has four arms 41, 42, 43 and 44, while cross beam 40 has four arms 45, 46, 47 and 48. All cross beam arms are U-shaped upwards.

Five suspension ropes 49, 50, 51, 52 and 53 are fastened at the crossing point of arms 41 through 44 of cross beam 39, all ropes lying in a vertical plane. At the crossing point of arms 45 through 48 of cross beam 40 there are accordingly also five fastened suspension ropes, of which the four ropes 54, 55, 56 and 57 may be seen in FIG. 1. To achieve even loading of the suspended pipe conduits 10 and 11, the suspension points of the suspension ropes on the upper directrix of the upper pipe conduit 10 are equally spaced six meters from one another. By means of cross bars with electrical isolators (not shown) on the cross beams 39 and 40 of the four-leg supports 21 and 22, long distance power supply lines may be supported along the system of the present invention.

The suspended pipe conduits 10 and 11 are tensioned downwards, by ropes 63, 64, 65, 66 and 67 running in the vertical plane between the bottom of the lower pipe conduit 11 and the corresponding foundations 58, 59, 60, 61 and 62.

The support legs are provided with adjustment means for compensating for slight foundation displacements. The rope suspension system is provided with a further correction and compensation capability. Preferably the adjustment consists of a hydraulic telescoping cylinder capable of lengthening and shortening a support leg.

Figure 2:
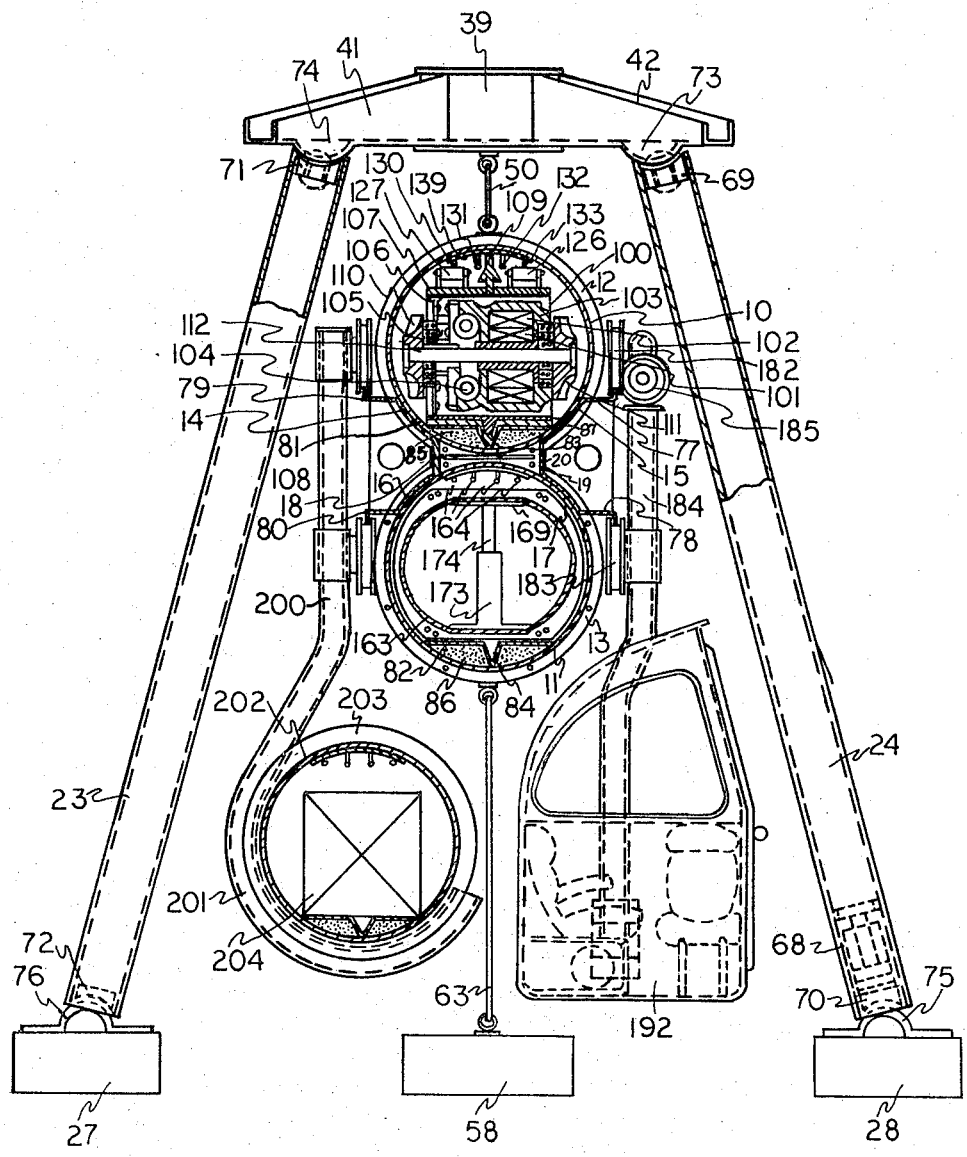
FIG. 2 is a section through the system shown in FIG. 1 and further showing moving trains both inside and outside the suspended pipe conduits.

Thus, one may see in FIG. 1, in the example of leg 24 of four-leg support 21, that a hydraulic telescoping cylinder 68 is mounted at the bottom of leg 24. The cylinder lengthens to elongate leg 24 in a situation where foundation 28 sinks. FIG. 2 shows more clearly the built-in telescoping cylinder 68 at the bottom of leg 24. FIG. 2 further shows that each upper and lower end of all support legs are provided with a pan or ball and socket type linkage 69, 70, 71 and 72, which are engaged by corresponding counterparts 73 and 74 at the bottom of the legs 41 and 42 of the cross beam 39 and by the corresponding counterparts 75 and 76 at the top of foundations 28 and 27. Hence, slight horizontal and vertical displacements of the foundations may be readily compensated for by the hingeable connections and the telescopically extendable support legs. The foundations of the four-legged supports are made of material which hardens also at low temperatures and is temperature resistant down to −60°C.

The opposite facing longitudinal edges of the walkway halves 14, 15, 16 and 17 partially enclose the outer walls of the pipe conduits 10 and 11 and rigidly interconnect the pipe conduits. Edges of walkway halves 14, 15. 16 and 17 are bent away from the outer walls of the pipe conduits 10 and 11 and form rails 77 and 78 and 79 and 80 along both sides of the pipes. Rails 77 and 78 are vertically located one above the other and rails 79 and 80 are located one above the other. An additional outer transportation track is thus provided on both sides of pipe conduits 10 and 11. The travel rails 77 and 79 of the outer tracks are at an angle of 90° upwards with respect to walkway halves 15 and 14, while the travel rails 78 and 80 are at 90° downward to the walkway havles 17 and 16. FIG. 2 shows a suspension train on rails 77 and 78 to the right of the support tubes 10 and 11, while a second suspension train drive along the opposite side of the support pipes on rails 79 and 80.

Each pipe 10 and 11 has a vehicle track 81 and 82 respectively extending essentially horizontally from the left to the right inner pipe wall at the bottom thereof. Transportation containers assembled into a train may move along tracks 81 and 82. Track 81 does not consist of two parallel rails, but of a steel plate welded to the inner wall of the pipe 10, said plate forming a gauge rail 83 along the middle thereof. Halves of track 81 on opposite sides of gauge rail 83 are slightly curved and inclined downwardly toward rail 83. In similar fashion the track 82 welded to the inner wall of pipe 11 is provided with a middle gauge rail 84. The space between the inner wall of pipe 10 and track 81 is filled with a synthetic foam, preferably polyurethane, below track 81. In similar fashion, the space between track 82 and the inner wall of pipe 11 is filled with a polyurethane foam 86. In the foam-filled space below track 81 and 82 there is room for energy supply lines as well as for the circuits 87 for monitoring the system. The steel tracks 81 and 82 are installed upon elastic supports and are preferably 750 mm wide. Gauge rails 83 or 84 are of a V-shaped cross-section, that is tamped out from the plate that forms tracks 81 ane 82 when installed, the bottom of the V-shaped rail 83 or 84 rests upon the lower directrix of the inner wall of the support tube 10 or 11. This not only increases the stability of the tracks, but also increases the section modulus of the pipes 10 and 11 in the direction of loading. The bedding of tracks 81 and 82 with the foam material also enables an even distribution of the loads to be absorbed by the transportation system.

Figure 3:
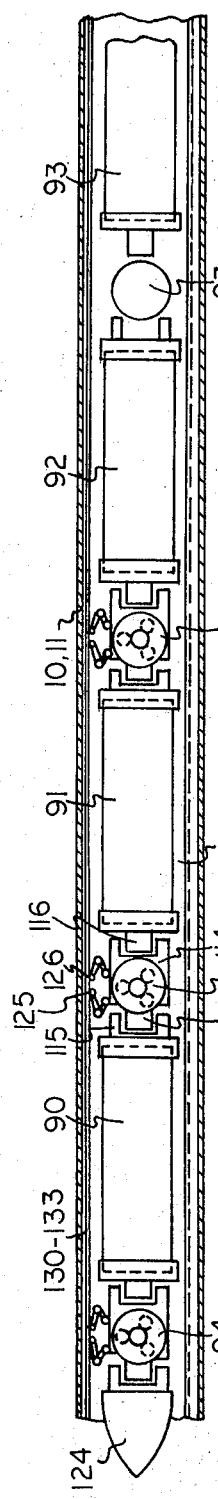
FIG. 3 is a vertical longitudinal section of a portion of a transportation pipe according to the teachings of the present invention having a portion of a freight train located inside.

FIG. 3 moves drive units 94, 95, 96 and 97 located between transportation containers 90, 91, 92 and 93 which form a train with the drive units resting on the tracks. Transportation containers 90 through 93 are suspended between the drive units 94 through 97 by means of appropriate couplings and do not make contact with tracks 81 or 82, or the inner wall of the support pipe 10 or 11.

One of the drive units 94 through 97 is shown sectioned in the upper support tube 10, in FIG. 2. The drive units each consist of a cylindrical drum 100 resting upon the track. A drive for drum 100 is an electrical motor, preferably AC, located inside drum 100. The motor has an armature 101 that is stationary and a field coil 102 that rotates with the motor housing 103. The motor drives a coupled sun and planet gear 105 via a hydrodynamic torque converter 104. An outer wheel 106 of the sun and planet gear is geared to the circular cross-sectioned inner wall of drum 100. The outer surface of drum 100 is coated with an abrasion and slip proof, elastic, rubber-like coating 107. Coating 107 conforms to the shape of the tracks 81 or 82, and has a bearing surface that is preferably slightly spherical on each side to form a double-conical profile tapering off toward both faces of the drum. This shape of coating 107 allows transmission of lateral loading forces to the slightly downwards curved track. Drums 100 equipped with the rubber-like bearing surfaces 107 ensure a minimal travel noise inside the outwardly wholly sealed support pipe system.

A very important advantage of the coated drums in that wear in the pipe railroad occurs on the drive unit and not on the travel rails which require great difficulty to repair or replace. As such, the system of the present invention will experience a long wear life.

A protruding rim 108 is provided as an integral part of drum 100 and extends around the periphery thereof. Rim 108 has a conically tapered cross-section and engages gauge rail 83 of track 81. The outer wall of drum 100 is covered on both sides of rim 108 with an elastic layer 107. Rim 108 and gauge rail 83 serve as lateral guides for drive drum 100. By inclining the track 81 and 82, the lateral forces acting on the roll-like drive are lessened at curves and thus the load on rim 108 and gauge rail 83 is diminished. Due to the ball-like curvature of drum surface 107, rim 108 and gauge rail 83 are only slightly loaded. FIG. 2 shows further a spacing rail 109 of V-shaped cross section that is fastened to the top of the inner wall of the support tube. Spacing rail 109 is spaced above rim 108 of drum 100 and while there is no contact therebetween during normal pipe railroad operation, spacing rail 109 engages rim 108 as drum 100 moves upwardly and thus prevents derailment of drum 100. Spacing rail 109 may also be fastened along the upper inner wall of the support pipe and positioned to engage one of two track rolls (not shown) that are linked to the drive units. Contact pressure between rail 109 and the rolls will increase during oscillations of the drive unit and counteract same. Track rail 81 and spacing rail 109 may be mounted separately as opposed to one piece construction. Replacement of the parts when necessary is thereby fostered.

Figure 7:
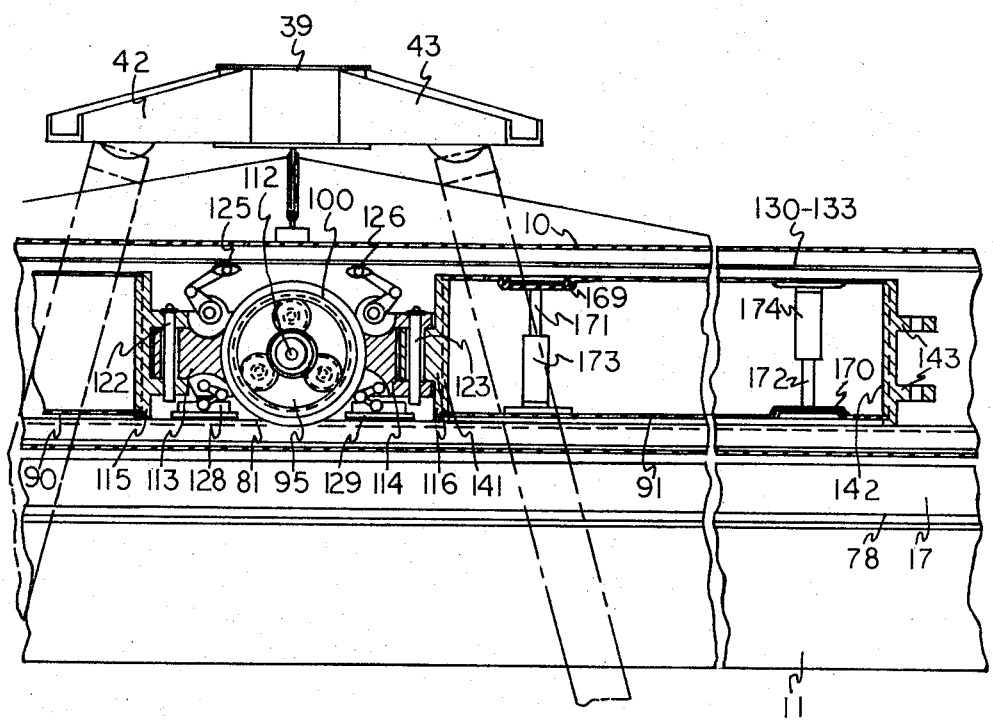
FIG. 7 is a vertical section of a portion of a vehicle train and conduit system showing the drive unit in more detail.

Drums 100 of the drive units are each surrounded by a horizontally located frame and supported therein. FIG. 2 shows frame parts 110 and 111 near the drum faces and FIG. 7 shows the remaining frame components. The drive drum 100 is therefore surrounded by a frame in the manner of a street roller. The frame is connected by an axle 112, which passes centrally through drum 100 and the drive motor armature 101. FIG. 7 shows the frame of drum 100 being provided with coupling components 113 and 114 at the front and at the rear respectively as seen in direction of drum travel motion. Likewise, transportation containers 90 and 91 are provided with coupling components at opposite ends thereof. Components 113 and 116 are male components while 114 and 115 are female components. The male components thus pass into the female components to provide a male/female coupling arrangement. Since each unit has a male coupling at one end and a female coupling at an opposite end, several drive units with frames may be coupled together to afford more driving power for a long train, an appreciable track ascent or the like. In the example of execution of FIG. 4, the two drive units 117 and 118 and the three drive units 119, 120 and 121 are shown immediately coupled one to another.

The couplings between the drive units 94 and 97 and the transportation containers 90 through 93 are all so developed as represented in enlargement in FIG. 7. A single vertical bolt 122 is inserted from above into the coupling components 113 and 115, so that the drive unit 95 is hingeably connected with the transportation container 90 at that spot. On the other hand, two neighboring bolts are inserted from above into the coupling components 114 and 116, the middle bolt 123 being shown in FIG. 7 whereby drive unit 95 is rigidly connected with the next transportation container 91. Each drive unit is thus hingeably connected at one side of the frame and rigidly at the other, so that a coupled train while in motion or during braking cannot be telescoped but nevertheless can negotiate curves. Both coupling components 113 and 114 of each drive unit are provided with three bore holes lying in a plane transverse to the pipe conduit axis, each of which may receive a coupling bolt. The front of the train is formed by rigidly coupling an aerodynamic container 124 (See FIGS. 3 and 4) to the first coupling component of the front drive unit 94. The aerodynamic container may contain control and monitoring equipment.

The frame of each drive unit 94 through 97 or 117 through 121 is provided with four independent current taps fastened to linkages at the top thereof. FIGS. 3 and 7 show current taps 125 and 126 of drive unit 95, and FIG. 1 shows current taps 126 and 127. Current tap 125 is linked to the top of coupling component 113 and current tap 126 to the top of coupling component 114. A magnetic brake 128 is linked to the bottom of the coupling component 113 and a magnetic brake 129 is linked to the bottom of the coupling component 114. Magnetic brakes 128 and 129 for each drive unit act upon the metallic track 81 or 82 to stop a slow movement of the train through the conduits.

Preferably four current rails 130, 131, 132 and 133 are mounted opposite to track 81 and 82 at the top of each support tube 10 and 11 and run along the entire length of the pipe conduit. Current rails 130, 131, 132 and 133 act in concert with the current taps 125, 126 and 127 of the drive units. Three of the current rails supply the alternating current for the drive motor, while the fourth rail feeds control and monitoring signals or braking current for the magnetic brakes 128 and 129 of the train system. The support tube acts as a return wire.

Figure 5:
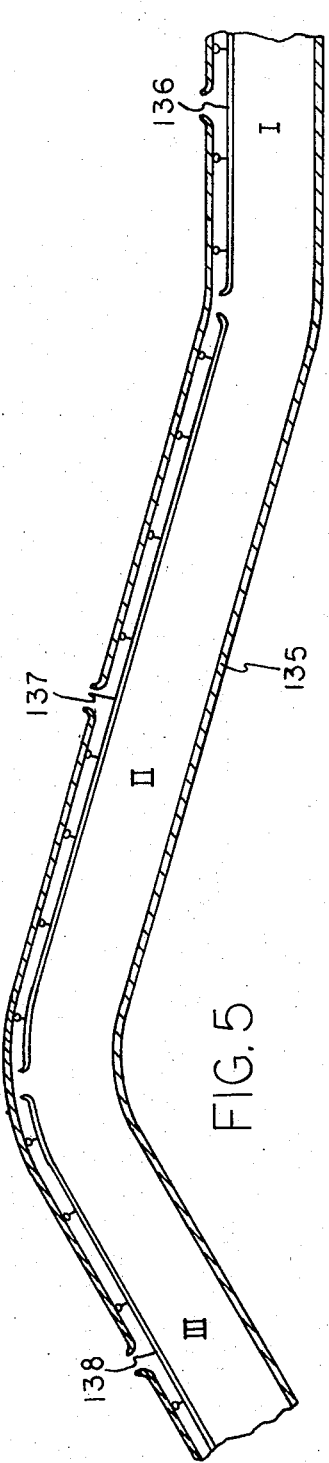
FIG. 5 is a side cross-sectional view of a portion of a pipe conduit showing an ascent and a drop in the conduit along the itinerary.

The current rails that supply travel power current may be subdivided into individually separated regulated segments along the itinerary. This is illustrated in FIG. 5, where a support tube 135 is shown, the tube being level in a zone I, whereas it ascends in a zone II and descends in a zone III. The AC motors of the drive units may by way of example have a power of 45 kw for a potential of 600 volts and a frequency of 60 Hz. The AC motors are frequency and voltage controlled. FIG. 5 shows the normal power being supplied into support tube 135 via the current rails 136 in zone I, while a higher potential and a lesser frequency are fed through current rails 137 in zone II and a lesser potential but higher frequency are fed through the current rails 138 in zone III. Each of these sections and changes are provided according to the power needs for the desired speed in the particular zone.

FIG. 1 shows the parallel current rails 130 through 133 and the spacing rail 109 that prevents derailment of the train being fastened to a common plate 139 extending along the entire length of the support tube and rigidly connected to the top of the inner wall thereof. Preferably plate 139 is welded to the support and further increases the section modulus of the particular support tube in the direction of loading. The current rails are electrically isolated when mounted.

Figure 6:
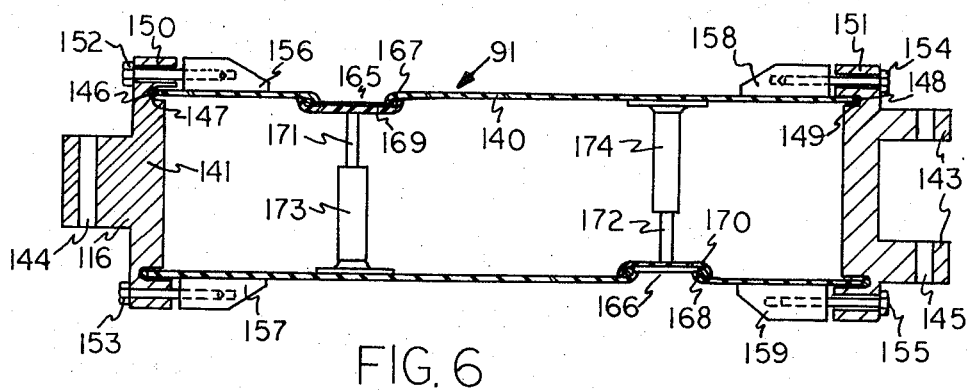
FIG. 6 is a vertical cross-sectional view of a transportation container according to the teachings of the present invention.

The transportation containers 90 through 93 are preferably manufactured from a thin wall pipe 140 (See FIG. 6). The front ends of pipe 140 are closed by relatively thick walled covers 141 and 142. Cover 141 carries male coupling 116 and cover 142 has female coupling 143 secured thereto. The protrusion of coupling 116 thus fits into the depression of coupling 143. Coupling 116 is provided with three contiguous vertical bore holes admitting two or three bolts to produce a rigid coupling. FIG. 6 shows the middle bore hole 144. On the other hand, it is acceptable for the flanges of the other coupling 143 to be provided with a single bore hole 145 for admission of one bolt whereby a hingeable coupling is produced. The left interfacing side of container 91 is secured by insertion of a seal ring 146 into a ring groove 147 provided therefor on the inside of the cover 142. Covers 141 and 142 are provided with flanges 150 and 151, respectively, which are connected via peripherally distributed screw sets 152 and 153 or 154 and 155 to straps 156 and 157 or 158 and 159 which are received around the periphery of the container pipe 140 and welded thereto.

Figure 4:
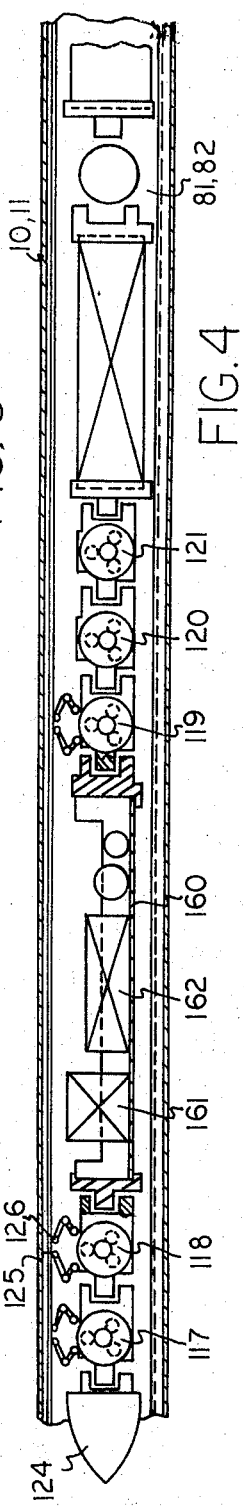
FIG. 4 is a further vertical longitudinal section as shown in FIG. 3, but illustrating a different type freight train therein.

Because of the relatively thick-walled covers 141 and 142, the interfacing sides of two transportation containers cannot tear open in the unlikely case of a collision. The containers, upon collision, will be crumpled midway of their length without being torn open. Containers 90 thorugh 93 for liquids or bulk materials preferably have a capacity of four cubic meters. FIG. 4 also shows an open container 160 for the transportation of bulk goods 161 and 162. Transportation container 160 preferably has a load capacity of 3.6 tons. Maximum axle load of the drive units 90 through 97 as well as of 117 through 121 amounts to 7 ¼ tons.

The sealed transportation containers 90 through 93 do not have a circular cross section. Instead, containers 90 through 93 have an oval cross section 163, which may be clearly recognized in the transportation container at the lower support tube in FIG. 2. This oval cross-sectioned container almost completely fills the free space between inner wall of support tube 135, track 82 or 81, spacing rail 109 and current rails 164 or 130 through 133.

The transportation containers 90 through 93 for liquids and loose goods are provided with automatically actuated filling and discharging shutters or valves. These shutters may be seen most clearly in FIG. 6. Thus, the transportation container 91 is provided with an opening 165 on the top of the container to permit filling and an opening 166 on the bottom of the container for emptying or discharge. Openings 165 and 166 are sealed from inside the container by means of a seal ring 167 or 168 and a valve plate 169 or 170, respectively. Valve plates 169 and 170 are engaged by piston rods 171 and 172 from telescoping props 173 and 174. Valve plates 169 and 170 are thus propped against the container inner wall opposite the container cover and hence simultaneously stiffen the transportation container. In this fashion, the telescopic props 173 and 174 are, respectively, secured between the lower and upper inner walls of the container. Obviously, other valve arrangements may also be provided for automatic filling and discharging containers 90 through 93. For example, such valves may be spring biased in the closed position and may be opened as desired by air or line pressure.

One hundred transportation containers are preferably assembled as one freight train with a control and monitoring unit deployed at the head of the train. The itinerary of the transportation scheme according to the invention is so planned for the region of application in Alaska, from Brudhoe Bay to the port of Valdez, that no greater ascent than 2.5 percent must be overcome for a track length of 1,585 kilometers, the sum of differences in height amounting to 3,500 meters. Optimized transportation speed for such conditions ranges between about 72 km/hr. and about 30 km/hr. The time of travel of goods being transported thus requires about 30.8 hours and the empty containers are returned in about 20.1 hours for refilling. Filling time for the containers holding 4 cubic meters is 1.5 seconds. Filling of transportation containers is preferably continuously accomplished in heated halls in two circular filling facilities. Discharge of the containers is preferably handled through remote-control means which automatically open the discharge valves when the valves are directly above tankers or above high-lying channels in supply tanks. The trains will not be stopped during discharge, rather the bottom valves of all containers, such as valve 170 of FIGS. 6 and 7, are automatically raised when the discharge openings lie directly above a tanker or a storage tank, and are reclosed thereafter.

Depending upon the degree of ascent, train length and number of drive units per train, speed of up to 80 km/hr. are possible. The drums of the drive unit may last up to 600,000 km before repair or replacement is required. Because of the small load of 0.25 amperes, the upper power contacts have a service life of approximately 12 years. Carbon contacts on the current taps should be renewed every 200,000 km.

Detection and monitoring units also may drive along track 81 or 82 inside support pipes 10 and 11 to vacuum up abraded particles. The detection and monitoring units are also provided with an automatic soldering apparatus for improving or repairing gauge rails 83 or 84 where needed.

Certain of the covers 141 and 142 on the interfacing sides of the transportation containers are preferably provided with a bracket (not shown) that protrudes outwardly therefrom. This bracket is covered with an elastic rubber around its outer edge and fills the empty support pipe cross section to an empty slit. The bracket and rubber thus act as a piston in a cylinder, and air enclosed in support pipes 10 or 11 is pushed ahead or compressed by the succeeding trains. The compressed air thus provides a drive boost for the preceding train. The upper edge of this piston bracket may slacken and thus allow current rails 130 through 133 and spacing rail 109 to pass through at those locations without coming into contact. The oscillations in the air pressure between two successive trains in motion may be made to actuate monitoring and control equipment. The degree of bracket sealing against the inner wall of the support tube, produced by the drive power of the train, is such that mechanical contact between moving trains is impossible. No accidents could, therefore, occur in the system between adjacent trains.

It was already explained during the illustration of FIGS. 1 and 2 that the four walkway halves 14 through 17 rigidly interconnect the two pipe conduits and are located one above the other to form two travel rails 77 and 78, and 79 and 80. Travel rails 77 and 78 and 79 and 80 are secured to both sides along the pipes and each pair provides an additional track. FIG. 2 shows rails 77 and 78 to provide the right hand outer transportation track, while rails 79 and 80 produce the left hand outer transportation track.

Figure 8:
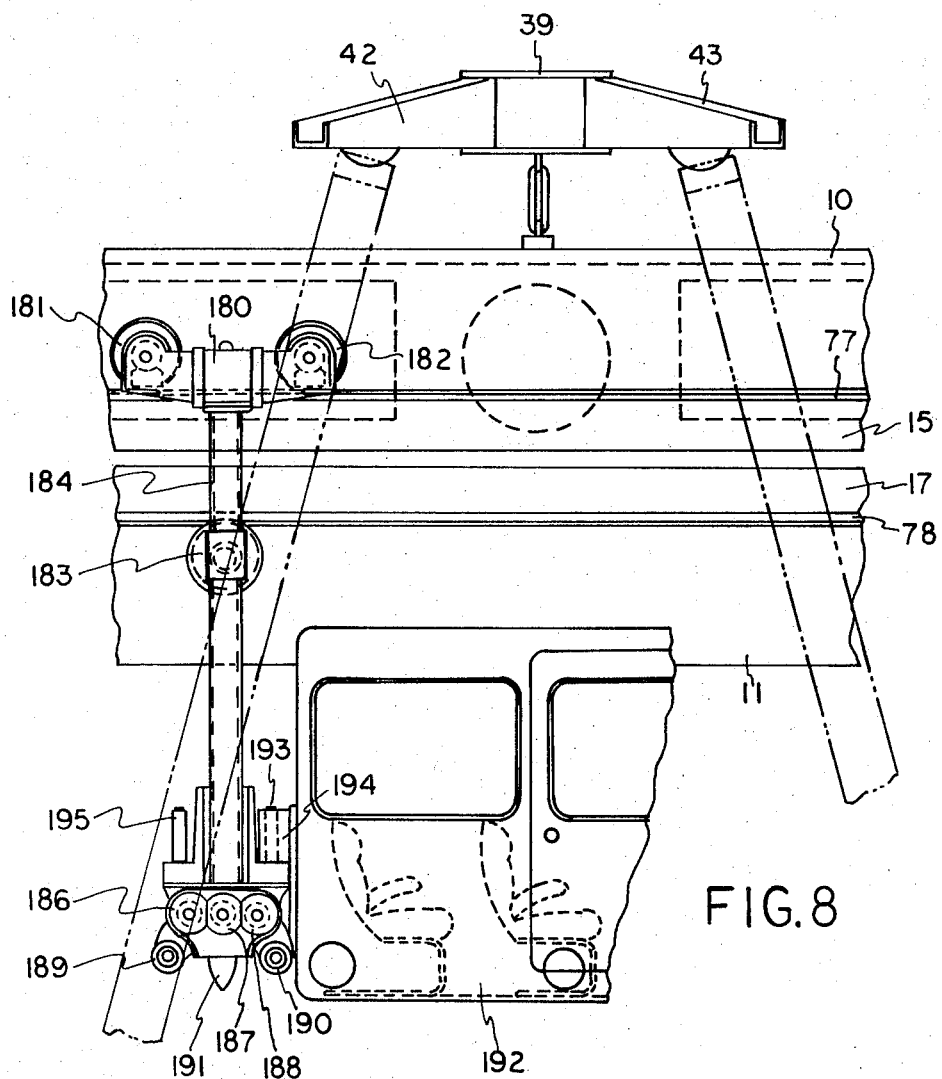
FIG. 8 is a partial side view of an outer transportation railroad system according to the teachings of the present invention.

FIG. 8 shows the right hand outer transportation track of FIG. 2 in side view. This transportation track is provided with a triple-roll suspension, two support rolls 181 and 182 being connected through a horizontal axle 180 and movable along the upper edge of the upper travel rail 77. One guiding roll 183 located below and between rolls 181 and 182 abuts the lower edge of the lower travel rail 78. Guide roll 183 is carried by an essentially vertical suspension system 184, the upper end of which is connected to the horizontal axle 180. A worm gear drive 185 is mounted in the horizontal axle 180 between the two support rolls 181 and 182 (FIG. 2). Worm gear drive 185 is driven by hydraulic engines connected to hydraulic pomps 186, 187 and 188 that are located at the bottom of the vertical suspension system 184. Oil coolers 189 and 190 are also provided adjacent pumps 186, 187 and 188, said coolers being associated with a container 191 for the circulating hydraulic oil. Worm gear drive 185 may also be actuated by a mechanical drive, for example, by a bottom-driven shaft that extends throughout the entire hollow suspension mechanism 184, from bottom to top.

FIG. 2 shows the bottom of the suspension system 184 bent at right angles to the vertical plane of symmetry through the two support pipes. FIG. 8 shows a nacelle 192 secured to suspension system 184 for the transportation of personnel. In this regard, the right hand side of suspension 184 is provided with a vertical bolt 193, accessible from above. Nacelle 192 is provided with a coupling component 194 having a bore hole therethrough. Suspension system 184 thus passes through the bore hole in coupling element 194 whereby nacelle 192 is suspended therefrom. Another bolt is present at the left bottom of the suspension 184, from which a second nacelle (not shown) may be suspended. In lieu of nacelles, containers for freight transportation may likewise be suspended from the bottom of the driven suspension system 184.

FIG. 2 shows a driven vertical suspension mechanism 200 on the left outer transportation track. The bottom of mechanism 200 is shown shaped into a load hook 201 for the transportation of a support tube 202. Support tube 202 need only be provided with a flange 203 during the construction of the transportation scheme according to the invention to be bolted to the previously constructed pipe conduits. The inner space of the support tube 202 may also be used for the transportation of loads 204.

The transportation scheme according to the invention may thus advance on its own during erection of the supports and conduits, etc. During construction of the transportation scheme, there is a sequence of drilling the foundations, filling the foundations, erecting a mast, producing the supports, suspending the pipe conduits from the supports and interconnecting the conduits with the outer transportation suspension tracks. All advance installations may be laid out so that they proceed along the right hand suspension track. In the sequence of operation, two legs of the four-legged support are laid while progressing alternately on the right and left hand sides without leaving the vicinity of the support tube. The need for building roads for the transportation of construction materials along the track is thus obviated according to the invention. Likewise, bulldozing, earth moving, clearing of an aisle in the forest, etc., are not required. Even if there are trees or wood to be removed from the itinerary, they may be transported away over the outer suspension track system. Fauna and flora are thus not affected and because of the location above ground, existing communication ways, agriculture, and forest are not affected.

Upon completion of the pipe railroad according to the present invention, the monitoring and inspection nacelles circulate on the outer rails. The outer rails are of such dimension that they allow circulation of independently driven freight and personnel carriers. To that effect, trains of suspended nacelles may be used. Such trains, preferably consist of sealed cabins and/or open transportation containers. The cabins may move without oscillation and may accommodate 12 travelers. The transportation container may hold up to 10 tons net cargo. Trains so driven may be program controlled without the need for a conductor, etc. Further, railroad stations may be set up at approximately 50 kilometer intervals, which are conveniently combined with transformer stations and groundworks for the inner pipe railroad. The railroad stations have loading and unloading facilities, shunt rails and connection facilities for side tracks.

Pollution due to emitted gases is avoided by the electrical drive of the pipe railroad. Moreover, the hydraulic pressure oil generator for the outer suspension tracks is decontaminated.

FIG. 1 shows furthermore that a laser gun 210 is mounted at the top of the four-legged support 21, acting as a transmitter, and that a correspondingly pointed receiver 211 is mounted at the top of the neighboring four-legged support 22. The measurements of the laser guns are fed to a central station, whereby sinkings and lateral shifts of the support legs may be detected and corrected. The monitoring instruments 210 and 211 are preferably mounted at the top of the supports, whereby detection may not be falsified by snow drifts.

Likewise, control of trains moving through the conduits may be accomplished by receivers and transmitters on the trains and within the conduits. Signals are transmitted to a central control station and utilized to compute proper speeds, etc., of the trains. Control signals are then transmitted to the individual trains to affect any memory corrections.

Figure 9:
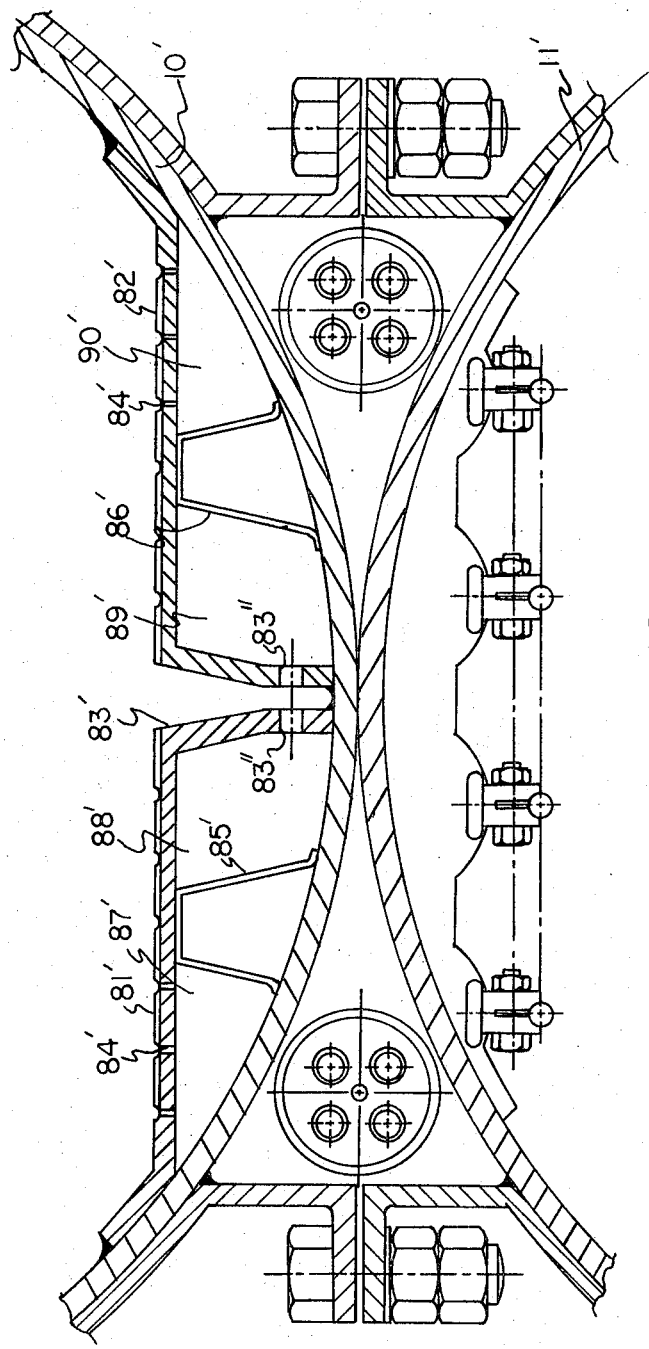
FIG. 9 is a partial vertical cross section of a portion of conduit illustrating another embodiment of the present invention.

In FIG. 9, a conduit 10' is shown in phantom atop a second conduit 11', illustrating a particular embodiment thereof. Conduit 10' has vehicle trackways 81' and 82' positioned therein to support a vehicle and define a gauge rail 83' therebetween. Trackways 81' and 82' are secured to the inner wall of tube 10' and are at least partially supported by members 85' and 86', respectively. Support members 85' and 86' divide the area under the trackways into compartments 87' and 88' and 89' and 90', respectively. Trackways 81' and 82' have a plurality of openings 84' disposed therealong, providing communication between compartments 87' and 89' and the inside of conduit 10' above the trackways. Gauge rail 83' has openings 83" along the sides thereof, openings 83" leading to compartments 88' and 90'.

Should it be desirable to clean conduit 10', a cleaning fluid received in compartments 87' and 89' can be forced through openings 84' into the interior of conduit 10'. The cleaning fluid will then exit from the conduit interior through openings 83" into compartments 88' and 90'. A cleaning procedure may thus be followed periodically along the vehicle path for preventative maintenance purposes.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A transportation system comprising:
  a. two conduits rigidly interconnected and disposed one above the other over at least the length of travel from one end to the other of the system, each of said conduits having a vehicle trackway received therein and extending therealong, said conduits further having vehicle power supply means disposed therein and extending at least a major portion of the length thereof;
  b. a loop trackway at said opposite ends of said conduits, said loops uniting said conduits at said ends, one of said loops having vehicle filling means associated therewith and the other of said loops having vehicle emptying means associated therewith;
  c. a plurality of supports for said conduits and said loops, said supports comprising a plurality of struts, a foundation for each strut, said struts being secured to said foundation at one end thereof, and a cross brace adjacent opposite, upper ends of said supports, said cross brace having members extending outwardly therefrom, said member being secured to said struts to form a unitary structure, the conduits being suspended from said supports over the length of travel of the system by a plurality of flexible cables connected between the supports and the upper conduit; and
  d. a vehicle receivable within said conduits and movable along said trackway.

2. A transportation system as defined in claim 1, wherein the support cross brace comprises a central element having a plurality of cross beams extending outwardly therefrom, said cross beams being secured to the upper end of said struts and said flexible cables for suspending said conduits being secured to said central element.

3. A transportation system as defined in claim 2, wherein said central member has means secured to a portion thereof for supporting power lines and insulating same from said structure.

4. A transportation system as defined in claim 1, wherein said struts of said supports have telescoping means received therein for varying the length thereof.

5. A transportation system as defined in claim 1, including further flexible cables secured between the lower conduit and the foundations.

6. A transportation system as defined in claim 1, wherein said conduits have feed and discharge cleaning fluid compartments disposed therealong, said compartments being in communication with the interior of said conduits for supplying cleaning fluid thereto and removing cleaning fluid therefrom.

7. A transportation system as defined in claim 6, wherein said compartments are disposed beneath said trackway.

8. A transportation system as defined in claim 1, wherein said conduits are connected to each other by four walkway members, two of said members forming a pair for one side of said conduits and being secured to said conduits and each other and the other two of said members forming a mirror image pair secured to the opposite side of said conduits and to each other, said members of each pair overlapping between the conduits and being secured to each other thereat.

9. A transportation system as defined in claim 8, wherein the portions of the trackway on opposite sides of the center gauge rail slope slightly downwardly towards said gauge rail to define a slightly curved track half on each side of said gauge rail.

10. A transportation system as defined in claim 9, wherein said gauge rail is V-shaped, the bottom of the V making contact with a portion of the conduit and being supported thereby.

11. A transportation system as defined in claim 8, wherein a space between said vehicle trackway and said conduit is filled with a synthetic foam.

12. A transportation system as defined in claim 11, wherein the synthetic foam is a polyurethane.

13. A transportation system as defined in claim 1, wherein the vehicle receivable therein comprises at least one transportation container, said container being removably coupled to and suspended between independent drum units at opposite ends thereof, the dimensions of said container being such that no contact is made between the container and the inner wall of the conduit.

14. A transportation system as defined in claim 13, wherein the drive unit comprises a cylindrical drum that is drivable along the vehicle trackway, said drum having a drive means received therein, power from said drive means being used to cause said drum to rotate to provide driving power to said vehicle.

15. A transportation system as defined in claim 14, wherein the drive means comprises an electrical motor, said motor having a stationary armature and a rotating field coil, a hydrodynamic torque converter coupled to said motor, a sun and planet gear means coupled to said hydrodynamic torque converter and said sun and planet gear being operatively associated with the inner wall of said drum so as to afford rotational movement thereto.

16. A transportation system as defined in claim 15, wherein the electrical motor has a housing, said housing rotating with said field coil and wherein an outer wheel of the sun and planet gear is geared to the inner wall of the drum.

17. A transportation system as defined in claim 15, wherein an outer surface of said drum mates with the vehicle trackway, said surface being slightly spherical in the direction of slant of the trackway surfaces.

18. A transportation system as defined in claim 17, wherein said outer surface has a centrally located rim protruding therefrom, said rim tapering conically away from said drum and mating with a V-shaped gauge rail along said vehicle trackway.

19. A transportation system as defined in claim 18, wherein a V-shaped rail member is positioned above said drum rim and is associated with said conduit, said rail member being out of contact with said drum rim during normal operation and serving as a safety device to prevent derailment of said vehicle.

20. A transportation system as defined in claim 19, wherein said rail member is engaged by at least one gauge roll, said gauge roll being hinged to said drive unit, said rail member reducing oscillations in said drive unit.

21. A transportation system as defined in claim 17, wherein at least a major portion of the outer surface of said drum has an elastic layer thereon, said layer engaging said vehicle trackway during movement of said drum thereacross.

22. A transportation system as defined in claim 15, wherein the drum is received around a horizontal frame and is supported thereby, said frame being connected to an axle, said axle passing centrally through said drum and said drive motor armature.

23. A transportation system as defined in claim 22, wherein said frame has a male coupling element secured to one end thereof and a female coupling element secured to an opposite end thereof, said coupling elements having means associated therewith for producing a union with an opposite element.

24. A transportation system as defined in claim 22, wherein said frame has a plurality of independent current taps secured thereto at an upper end thereof and at least one magnetic brake associated therewith, said brake being actuatable to engage said trackway.

25. A transportation system as defined in claim 24, wherein four current rails are received in the upper end of said conduits, said current rails extending along at least a major portion of said conduits and being engageable by said current taps, three of said rails supplying alternating current to said drive unit when engaged by said current taps and one of said rails providing a means for conducting control and monitoring signals to and from said drive unit.

26. A transportation system as defined in claim 25, wherein said current rails are subdivided into individually separated segments along said conduits.

27. A transportation system as defined in claim 24, wherein said current rails are secured to a plate which is in turn secured to the inner upper wall of said conduit.

28. A transportation system as defined in claim 13, wherein said tranportation container comprises a thin-walled pipe, said pipe being sealed at opposite ends thereof by thick-walled covers, one of said covers having a male coupling member associated therewith and the opposite cover having a female coupling member associated therewith.

29. A transportation system as defined in claim 28, wherein said transportation container has an oval cross section, corresponding approximately to the remaining cross sectional space of the conduit.

30. A transportation system as defined in claim 28, wherein said transportation container has at least one opening therealong, said opening being sealed from within said container by a seal ring and a valve plate, said plate being biased in the closed position by a hydraulic piston.

31. A transportation system as defined in claim 30, wherein said container has a valve opening along the top thereof and a valve opening along the bottom thereof, each valve opening being biased in the sealed position by a hydraulic piston.

32. A transportation system as defined in claim 31, wherein said bottom valve is automatically actuatable for discharge of contents from said transportation container.

33. A transportation system as defined in claim 13, wherein said transportation container has a flexible member secured around its outer periphery and extending outwardly therefrom, said flexible member substantially filling the remainder of the cross section of said conduit.

34. A transportation system as defined in claim 33, wherein said member is a bulging rubber member whose dimensions are such that air in said conduit is forced ahead of said vehicle during movement thereof.

35. A transportation system as defined in claim 33, wherein pressure control means are provided for said system, said control means being responsive to air pressure between adjacent vehicles to control the relative speeds thereof.

36. A transportation system of claim 13, wherein said drive units comprise:
 a. a frame, said frame having coupling elements secured thereto and extending outwardly therefrom;
 b. a drum received around said frame, said drum having an outer driving surface therearound;
 c. a motor received within said frame;
 d. a hydrodynamic torque converter received within said frame and coupled to said motor; and
 e. a sun and planet gear arrangement coupled to said torque converter, said sun and planet gear further being coupled to said drum to afford rotational motion thereto.

37. A drive unit as defined in claim 36, wherein said motor is an electrical motor and wherein said motor has an armature and a field coil, said armature being stationary and said field coil rotating with a housing of said motor.

38. A drive unit as defined in claim 36, wherein said inner wall of said drum has gear teeth around a section thereof, said teeth meshing with an outer gear of said sun and planet gear to afford rotational motion to said drum.

39. A drive unit as defined in claim 36, wherein an outer surface of said drum is of a shape that mates with the vehicle trackway, said surface being slightly spherical in the direction of slant of the trackway surfaces.

40. A drive unit as defined in claim 39, wherein said outer surface has a centrally located rim protruding therefrom, said rim tapering conically away from said drum so as to reside within the gauge rail.

41. A drive unit as defined in claim 39, wherein at least a major portion of the outer surface of said drum has an elastic layer therearound, said layer engaging said vehicle trackway during movement of said drum thereacross.

42. A drive unit as defined in claim 36, wherein said coupling elements comprise a male element extending in one direction and a female element extending in an opposite direction, both elements having bolt receiving bore holes therein.

43. A drive unit as defined in claim 36, wherein said frame has secured to an upper portion thereof, at least one current tap.

44. A drive unit as defined in claim 36, wherein at least one magnetic brake is secured to said frame.

45. The system of claim 13, wherein said container comprises:
 a. an elongated tubular member, and a cover plate secured at opposite ends of said container, said cover plates having coupling elements secured thereto and extending outwardly therefrom;
 b. a first drive unit connected to said container at one of said coupling elements; and
 c. a second drive unit connected to said container at said other of said coupling elements, said drive units comprising a frame, a coupling element secured to opposite sides of said frame and extending outwardly therefrom, a drum received around said frame, a motor received within said frame, a torque converter received within said frame and coupled to said motor, a sun and planet gear coupled to said torque converter, and to an inner wall of said drum to afford rotation to said drum.

46. A vehicle as defined in claim 45, wherein said drum has a rib protruding therefrom around the middle thereof.

47. A vehicle as defined in claim 46, wherein said drum has an elastic layer around at least a major portion thereof on both sides of said rib.

48. A vehicle as defined in claim 45, wherein said container has a fill valve on the top side thereof, and a discharge valve on the bottom side thereof.

49. A vehicle as defined in claim 48, wherein a hydraulic prop is associated with each valve to normally bias said valves in the closed position.

50. A vehicle as defined in claim 45, wherein said container has an oval cross-section.

51. A vehicle as defined in claim 45, wherein said container has a rubber gasket secured therearound and extending outwardly therefrom.

52. A vehicle as defined in claim 45, wherein said frame of said drive units has at least one current tap secured to the top thereof and wherein at least one magnetic brake is associated with at least one of said coupling elements.

53. A transportation system as defined in claim 1, comprising further a detection and monitoring vehicle movable within said conduit along said vehicle trackway, said vehicle having equipment associated therewith to clean and repair the vehicle trackway.

54. A transportation system as defined in claim 8, wherein at least two of said walkway members are bent at an outer portion thereof to provide an upper and lower rail for an outside rail transportation system.

55. A transportation system as defined in claim 1, wherein the vehicle trackway within said conduits is provided by a horizontal member mounted within the conduits and secured to an inner wall thereof, said member having a center gauge rail along its length.

56. A transportation system as defined in claim 54, wherein said outside vehicle is suspended from said outside rails and movable therealong, said vehicle comprising a trio of wheels, a drive unit operatively associated with at least one of said wheels and a vehicle body suspended from said wheels.

57. A transportation system as defined in claim 56, wherein the drive unit comprises a worm gear, said gear being mounted in a horizontal axle between a pair of said rolls, and a hydraulic engine operatively connected to said worm gear.

58. A transportation system as defined in claim 57, wherein the vehicle body is a nacelle.

59. A transportation system as defined in claim 56, wherein control means are received on said outside vehicle to monitor the condition of the transportation system.

* * * * *